Sept. 13, 1927.  G. NELSON  1,642,622

CHOKER HOOK

Filed Nov. 18, 1926

INVENTOR
GUST NELSON

BY
Fetherstonhaugh & Co
ATTORNEYS

Patented Sept. 13, 1927.

1,642,622

UNITED STATES PATENT OFFICE.

GUST NELSON, OF VANCOUVER, BRITISH COLUMBIA, CANADA, ASSIGNOR OF ONE-HALF TO FRANK R. PENDLETON, OF VANCOUVER, BRITISH COLUMBIA, CANADA.

CHOKER HOOK.

Application filed November 18, 1926. Serial No. 149,207.

My invention relates to improvements in choker hooks the object of which is to provide means whereby the end eye splice of a hoisting or choker line may be quickly and securely fastened to the line subsequent to its having been passed around a log or other load. A further object is to provide means whereby the hook may, if desired, be locked in position, yet so locked as to be readily released, and also to provide means whereby the hook may be released automatically and the load permitted to fall, on the choker line being lowered from the block or other device from which it is suspended.

The invention consists essentially of a slide adapted to be mounted upon a choker line to which a hook having an outwardly extending lever is hingedly connected, as will be more fuly described in the following specification, in which:—

In the drawings like characters of reference indicate corresponding parts in each figure.

Figure 1:
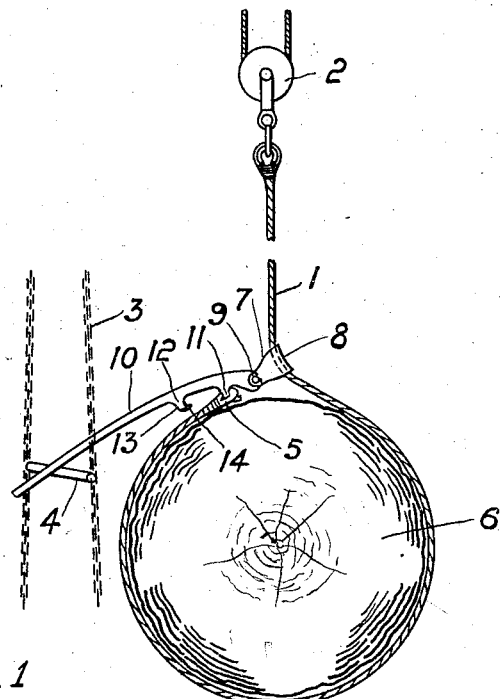
Fig. 1 is a general view of the invention as fitted for the automatic release of its load on the lowering of the block to which the choker line is attached.

When the choker hook is to be used for the purpose of releasing its load automatically, the choker line indicated by the numeral 1 is connected to a block 2 or otherwise suspended from a travelling carriage, not shown, from which a pair of chains 3 are suspended and which are cross connected at intervals by flights 4. The free end of the choker line is provided with an eye splice 5 which is adapted to be passed around the load or log 6 and attached to the choker hook generally indicated by the numeral 7. The choker hook 7 comprises a slide 8 formed from a piece of sheet material bent in the form of a U and connected together at its free ends by a pin 9. Hingingly mounted upon the pin 9 and between the free ends of the U shaped slide 8 is a lever 10 which is adapted to project in a downwardly and outwardly direction beyond the load 6 and is provided adjacent its inner end with an inturned hook 11, on its lower edge upon which the eye 5 of the choker line is adapted to be placed. Intermediate the length of the lever and preferably close to the hook 11 is a further hook member 12, which projects downwardly to approximately the thickness of the choker line to which it is fitted as at 13, where its direction is turned laterally to form a tongue 14 which is adapted to be projected under the line 1 adjacent the eye 5 for the purpose of preventing the inadvertent displacement of the hook 11 when the load is being transported amidst obstructions, such as the branches of trees and the like.

Having thus described the several parts of my invention I will now briefly explain its use.

When the choker line is being used in conjunction with a conveyor such as the one forming the subject matter for an application for patent filed simultaneously with this, or with any other suitable device, the hoisting block 2 is lowered until the eyed end 5 of the choker line 1 can be passed under the load, the lever 10 is swung transversely of the load and the eye 5 of the choker line placed upon the hook 11. As the load is raised towards the conveying means the lever 10 comes into contact with the flights 4 of the chains 3 displacing them from their normal position of suspension and passing them progressively upwards until the lifting of the load ceases, when the lever will project betwen the chains and one pair of flights 4. On the lowering of the block 2 the outer end of the lever 10, will be held against downward movement by the first flight 4 with which it comes into engagement, so that the continued lowering of the block will cause the lever to be swung upwards about its pivot pin 9 and release the hook 11 from the eye 5, thus freeing the choker line from its load and allowing the said load to fall to the ground.

Figure 2:
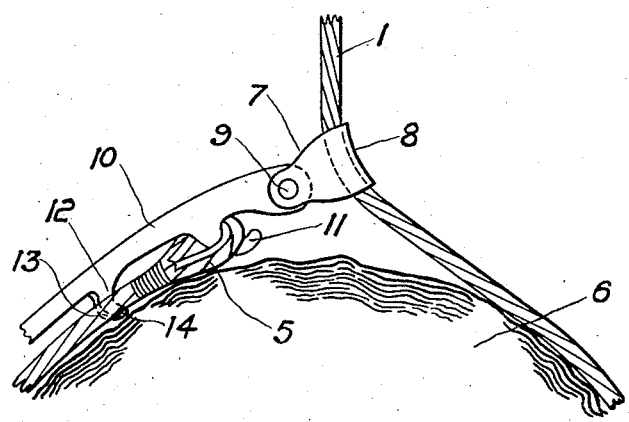
Fig. 2 is a view showing the use of the hook in locked position as when used for manually releasing.

If the choker is used in situations where the automatic release is not required, the chains and the flights are dispensed with, but the tongue 14 of the lever 10 is slipped under the choker line 1 as shown in Figure 2, prior to any lifting strain being imposed thereupon, so that the tightening of the line about the load will bind the tongue between it and the load, thus eliminating the possibility of the lever being moved and the hook 11 withdrawn from the eye 5 through its meeting with any obstruction during transportation.

What I claim as my invention is:

1. The combination of a hoisting line, a choker hook carried by the line and adapted to connect an end of the line to an intermediate portion of said line after being passed about a load and hook releasing means positioned to engage the hook when the hoisting line is lowered and to thereby disconnect the hook from the end of the line to release the load.

2. The combination of a hoisting line having an eye at its outer end, a lever equipped with a slide carried by the line and freely movable therealong, a hook on the lever engageable with the eye of the line to form a load carrying bight, and lever engaging means arranged to automatically free the hook of the lever from the eye of the line when the latter is lowered so as to release the load carried thereby.

3. Apparatus as recited in claim 2 in which the said lever engaging means comprises flexible elements connected by flights supported to lie in the path of the lever as the line is lowered.

Dated at Vancouver, B. C., this 12th day of November, 1926.

GUST NELSON.